United States Patent
Zhang et al.

(10) Patent No.: US 9,929,882 B1
(45) Date of Patent: Mar. 27, 2018

(54) METHOD AND APPARATUS FOR ACCURATELY ESTIMATING A DISTANCE BETWEEN WIRELESS NETWORK DEVICES

(71) Applicant: Marvell International Ltd., Hamilton (BM)

(72) Inventors: Hongyuan Zhang, Fremont, CA (US); Sudhir Srinivasa, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 60 days.

(21) Appl. No.: 14/501,655

(22) Filed: Sep. 30, 2014

Related U.S. Application Data

(60) Provisional application No. 61/885,318, filed on Oct. 1, 2013.

(51) Int. Cl.
| | |
|---|---|
| *H04B 7/06* | (2006.01) |
| *H04B 7/08* | (2006.01) |
| *H04B 1/18* | (2006.01) |
| *H04W 56/00* | (2009.01) |
| *H04L 25/02* | (2006.01) |
| *H04L 12/26* | (2006.01) |

(52) U.S. Cl.
CPC .......... *H04L 25/0202* (2013.01); *H04L 43/08* (2013.01)

(58) Field of Classification Search
CPC ............................ H04L 25/022; H04W 52/325
USPC ........................................ 375/316; 370/342
See application file for complete search history.

(56) References Cited

U.S. PATENT DOCUMENTS

| | | | | |
|---|---|---|---|---|
| 2003/0118152 A1* | 6/2003 | Winsor | .................. | A61B 6/583 378/62 |
| 2003/0118162 A1* | 6/2003 | Itoh | .......................... | H04Q 1/44 379/93.01 |
| 2004/0028013 A1* | 2/2004 | Fitton | .................. | H04B 1/7107 370/335 |
| 2004/0248527 A1* | 12/2004 | Park | ........................ | H04L 5/023 455/118 |
| 2006/0227886 A1* | 10/2006 | Li | ........................ | H04B 17/336 375/260 |

(Continued)

OTHER PUBLICATIONS

Palanivelu, Arul et al. "Symbol Timing correction based on LLTF." Marvell Semiconductor Inc., Aug. 11, 2010. Lecture.10 pages.

(Continued)

*Primary Examiner* — Parth Patel
*Assistant Examiner* — Jason Harley

(57) ABSTRACT

A receiver for a wireless device. A channel estimation module is configured to calculate a first channel estimate on a first tone of a data packet and calculate a second channel estimate on a second tone of the data packet. A phase roll estimation module is configured to calculate a conjugate of the second channel estimate and calculate, using the first channel estimate and the conjugate of the second channel estimate, an estimate of a phase roll caused by an error in symbol timing of the data packet. The phase roll corresponds to a difference between phases across adjacent tones of the data packet. The phase roll estimation module is further configured to calculate, based on the estimate of the phase roll, a timing advance to be applied to the symbol timing of the data packet. The timing advance corresponds to a number of samples of the data packet.

16 Claims, 5 Drawing Sheets

(56) References Cited

U.S. PATENT DOCUMENTS

| | | | | |
|---|---|---|---|---|
| 2007/0098092 | A1* | 5/2007 | Mitran | H04L 25/0206 375/260 |
| 2007/0230403 | A1* | 10/2007 | Douglas | H04W 24/00 370/334 |
| 2007/0237274 | A1* | 10/2007 | Nakache | H04L 27/2657 375/355 |
| 2008/0008255 | A1* | 1/2008 | Jain | H04L 25/14 375/260 |
| 2008/0262772 | A1* | 10/2008 | Luinge | G06F 3/011 702/94 |
| 2009/0215401 | A1* | 8/2009 | Yoon | H04B 7/0617 455/67.14 |
| 2013/0310074 | A1* | 11/2013 | Porzio Giusto | G01S 11/02 455/456.1 |

OTHER PUBLICATIONS

LAN/MAN Standards Committee. Part 11: Wireless LAN Medium Access Control (MAC) and Physical Layer (PHY) specifications Amendment 8: IEEE 802.11 Wireless Network Management. IEEE Std 802.11v™—2011 ed. New York, NY: IEEE Computer Society, Feb. 9, 2011, 433 pages.

IEEE Std. 802.11a-1999; Supplement to IEEE Standard for Information Technology—Telecommunications and information exchange between systems—Local and metropolitan area networks—Specific requirements; Part: 11 Wireless LAN Medium Access Control (MAC) and Physical Layer (PHY) specifications; High-speed Physical Layer in the 5 GHz Band; pp. 1-91.

IEEE P802.11ac / D2.1; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Mar. 2012; 363 pages.

IEEE Std. 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," The Institute of Electrical and Electronics Engineers, Inc., Nov. 2011.

IEEE P802.11ah/D1.0 Draft Standard for Information Technology—Telecommunications and Information Exchange Between Systems Local and Metropolitan Area Networks—Specific Requirements; Part 11: Wireless LAN Medium Access Control (MAC) and Physical Layer (PHY) Specifications; Amendment 6: Sub 1 GHz License Exempt Operation; Oct. 2013; 394 Pages.

IEEE Std. 802.11b; Supplement to IEEE Standard for Information technolgy—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; Sep. 16, 1999; 96 Pages.

IEEE P802.11g/D8.2 Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; Apr. 2003, 69 Pages.

IEEE P802.11n.TM./D3.00, Draft Standard for Information Technology—Telecommunications and information exchange between systems—Local and metropolitan area networks—Specific requirements, Part 11: Wireless LAN Medium Access Control (MAC) andPhysical Layer (PHY) specifications: Amendment 4: Enhancements for Higher Throughput, The Institute of Electrical and Electronics Engineers, Inc., Sep. 2007, 544 pages.

802.16/2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.

IEEE Std 802.20/2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29, 2008; 1032 pages.

"Specification of the Bluetooth System" Master Table of Contents & Compliance Requirements—Covered Core Package version: 4.0; Jun. 30, 2010; 2302 pages.

IEEE Std. P802.11ad/D5.0; Draft Standard for information technology—Telecommunications and information exchange between systems Local and metropolitan area networks—Specific requirements; Part 11: Wireless LAN Medium Access Control (MAC) and Physical Layer (PHY) Specifications; Amendment 3: Enhancements for Very High Throughput in the 60 GHz Band; Sep. 2011; 601 Pages.

IEEE Std. 802.Nov. 2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.

* cited by examiner

METHOD AND APPARATUS FOR
ACCURATELY ESTIMATING A DISTANCE
BETWEEN WIRELESS NETWORK DEVICES

CROSS-REFERENCE TO RELATED
APPLICATIONS

This application claims the benefit of U.S. Provisional Application No. 61/885,318, filed on Oct. 1, 2013. The entire disclosure of the application referenced above is incorporated herein by reference.

FIELD

The present disclosure relates to packet detection and symbol synchronization in communication between wireless network devices, and more particularly to systems and methods for estimating distances between and positions of wireless network devices.

BACKGROUND

Wireless local area networks (WLANs) may include an access point (AP) and one or more client stations. Various operating standards for WLANs include, but are not limited to, Institute for Electrical and Electronics Engineers (IEEE) 802.11a, 802.11ac, 802.11af, 802.11ah, 802.11b, 802.11g, and 802.11n. Some standards define protocols for determining distances between different WLAN devices. For example, IEEE 802.11mc proposes modifications to various 802.11 standards to allow for fine measurement of location of WLAN devices (e.g., a resolution of 1 meter).

Measuring distances between and positions of WLAN devices at a high resolution requires accurate symbol boundary estimation. For example, a resolution of 3 meters corresponds to a timing resolution of 10 nanoseconds (ns). Conversely, a resolution of 3 cm corresponds to a timing resolution of 0.1 ns. Accordingly, accurate location estimation requires extremely accurate symbol boundary estimation.

SUMMARY

A receiver for a wireless device includes a channel estimation module and a phase roll estimation module. The channel estimation module is configured to calculate a first channel estimate on a first tone of a data packet received by the receiver and (calculate a second channel estimate on a second tone of the data packet. The phase roll estimation module is configured to calculate a conjugate of the second channel estimate and calculate, using the first channel estimate and the conjugate of the second channel estimate, an estimate of a phase roll associated with symbol timing of the data packet. The phase roll corresponds to a difference between phases across adjacent tones of the data packet, and the phase roll is caused by an error in the symbol timing. The phase roll estimation module is further configured to calculate, based on the estimate of the phase roll, a timing advance to be applied to the symbol timing of the data packet. The timing advance corresponds to a number of samples of the data packet.

A method for operating a receiver for a wireless device includes calculating a first channel estimate on a first tone of a data packet received by the receiver, calculating a second channel estimate on a second tone of the data packet, calculating a conjugate of the second channel estimate, and calculating, using the first channel estimate and the conjugate of the second channel estimate, an estimate of a phase roll associated with symbol timing of the data packet. The phase roll corresponds to a difference between phases across adjacent tones of the data packet and the phase roll is caused by an error in the symbol timing. The method further includes calculating, based on the estimate of the phase roll, a timing advance to be applied to the symbol timing of the data packet, and applying the timing advance to processing of the data packet received by the receiver. The timing advance corresponds to a number of samples of the data packet.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Estimates of boundaries between symbols of a data packet (e.g., boundaries between fields of a preamble of the data packet) may be used to determine symbol timing, including symbol timing error and a linear phase ramp (i.e., "phase roll") caused by symbol timing error, which can then be used to correct the symbol timing. Various factors (e.g., fading, time domain cyclic delay diversity (CDD), thermal noise and impairments, channel noise, etc.) impair estimation of the boundaries between the symbols.

Phase roll estimation systems and methods according to the principles of the present disclosure more accurately estimate the symbol boundaries to correct the symbol timing and more accurately estimate distances between and locations of wireless local area network (WLAN) devices.

Figure 1:
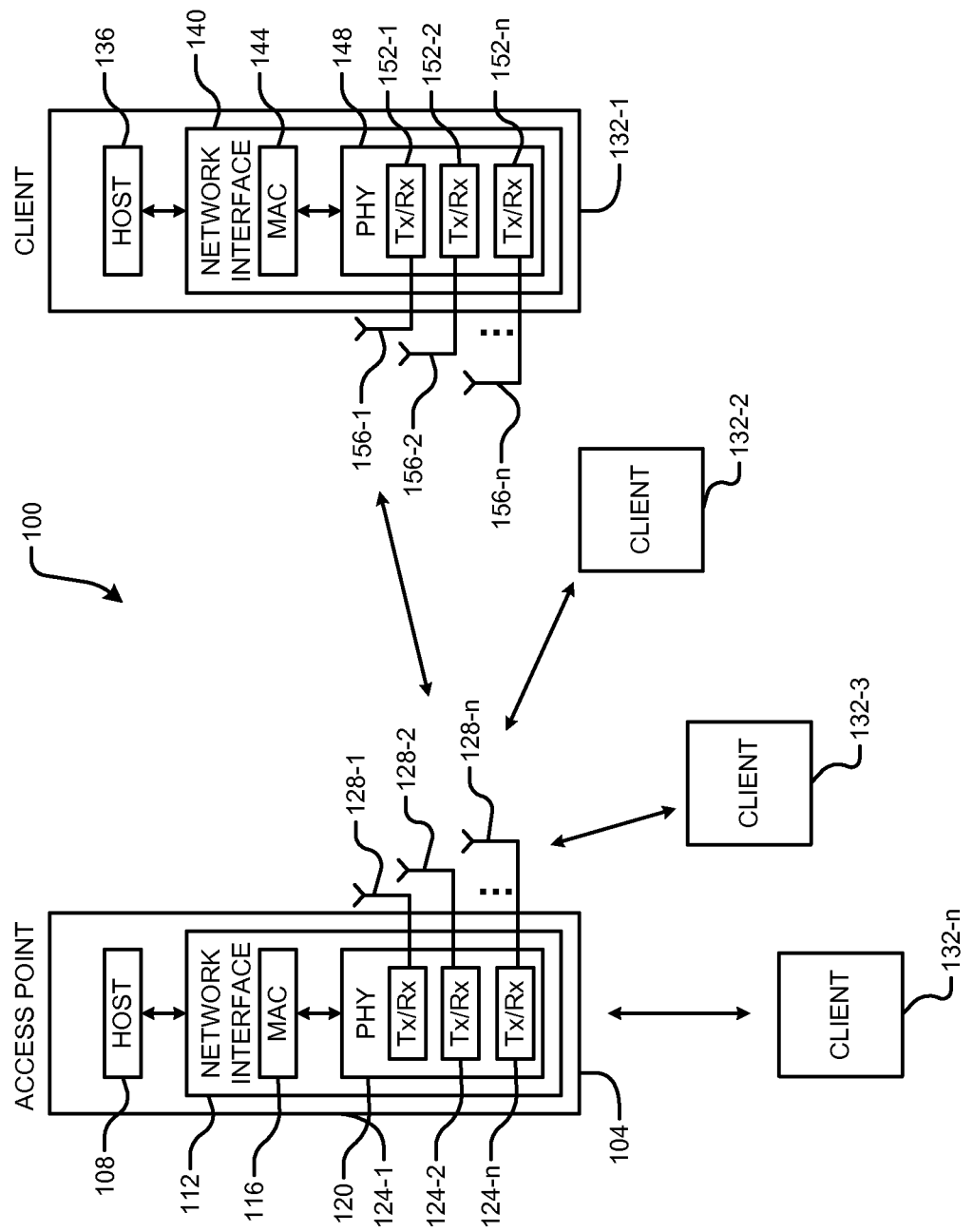
FIG. 1 is a functional block diagram of an example wireless local area network according to the principles of the present disclosure.

FIG. 1 shows an example WLAN 100 including one or more wireless communication devices configured to implement the phase roll estimation systems and methods according to an embodiment of the present disclosure. The WLAN 100 includes an access point (AP) 104 having a host processor 108 in communication with a network interface 112. The network interface 112 includes a medium access control (MAC) device 116 and a physical layer (PHY) device 120. The PHY device 120 includes a plurality of transceivers 124-1, 124-2, . . . , and 124-n, referred to collectively as transceivers 124. The transceivers 124 communicate with respective antennas 128-1, 128-2, . . . , and 128-n, referred to collectively as antennas 128.

The AP 104 communicates with a plurality of client stations 132-1, 132-2, 132-3, . . . , and 132-n, referred to collectively as client stations 132. The client station 132-1 includes a host processor 136 in communication with a network interface 140. The network interface 140 includes a MAC device 144 and a PHY device 148. The PHY device 148 includes a plurality of transceivers 152-1, 152-2, . . . , and 152-n, referred to collectively as transceivers 152. The transceivers 152 communicate with respective antennas 156-1, 156-2, . . . , and 156-n, referred to collectively as antennas 128. One or more of the client stations 132 may have a same or similar structure as the client station 132-1. For example only, each of the client stations 132 may have a same or different number of the transceivers 152 and the antennas 156.

The host processor 108, the MAC device 116, and/or the PHY device 120 of the AP 104 and the host processors 136, the MAC devices 144, and/or the PHY devices 148 of the client stations 132 may be configured to generate data packets. The transceivers 124 and 152 are configured to transmit the data packets via the respective antennas 128 and 156. Conversely, respective receiving devices (i.e., the AP 104 and/or the client stations 132) are configured to selectively process the received data packets. For example, the transceivers 124 and 152 include respective receiver portions (i.e., receivers) configure to implement the phase roll estimation systems and methods according to an embodiment of the present disclosure.

Figure 2:
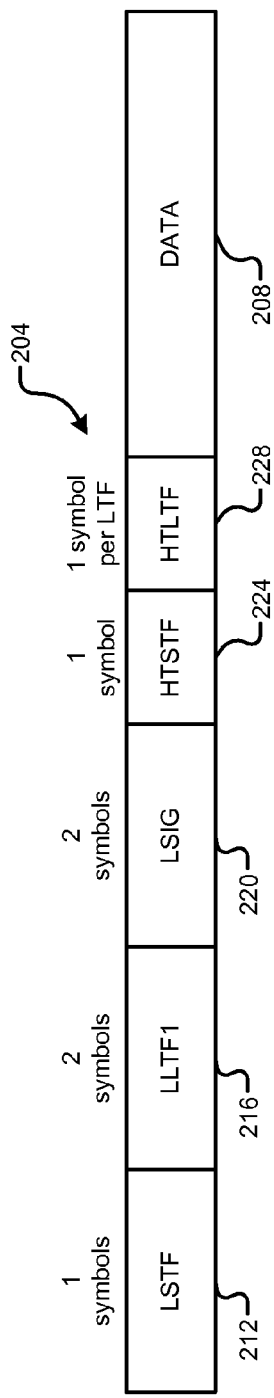
FIG. 2 is an example data packet according to the principles of the present disclosure.

FIG. 2 shows an example data packet 200 transmitted by a transmitting device (e.g., the AP 104 or one of the client stations 132 of FIG. 1) and received by a receiving device (e.g., the AP 104 or one of the client stations 132 of FIG. 1). The data packet 200 includes a preamble 204 and a data portion 208. The preamble 204 includes a legacy short training field (LSTF) 212, a legacy long training field (LLTF) 216, a legacy signal (LSIG) field 220, a high throughput short training field (HTSTF) 224, and a high throughout long training field (HTSTF) 228.

Figure 3:
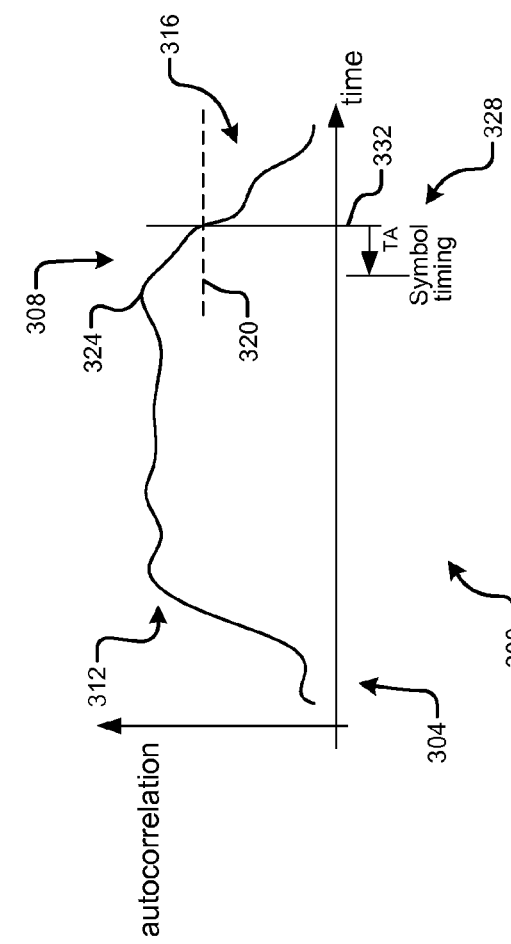
FIG. 3 illustrates example estimation of symbol boundaries using autocorrelation according to the principles of the present disclosure.

FIG. 3 shows a graph 300 illustrating autocorrelation between symbols of the LSTF 212 in the preamble 204 of the data packet 200. For example, the LSTF 212 is periodic in the time domain (e.g., each of the two symbols of the LSTF 212 includes five periods of a particular time domain signal). Accordingly, each symbol of the LSTF 212 corresponds to 5*0.8 µs=4 µs (where, for example only, each time domain signal corresponds to 8 µs). Two symbols of the LSTF 212 correspond to a total of 8 µs, or ten periods of a 0.8 µs signal, and the autocorrelation shown in FIG. 3 corresponds to autocorrelation between two adjacent 0.8 µs intervals.

As shown in FIG. 3, the symbols of the LSTF 212 begin at approximately 304 and end at approximately 308, and correlation between the repeated same symbols of the LSTF 212 is relatively high as shown at 312. Conversely, correlation decreases when the symbols of the LLTF 216 begin as shown at 316. Accordingly, a boundary between the end of the LSTF 212 and the beginning of the LLTF 216 can be estimated based on the autocorrelation.

For example, the boundary between the LSTF 212 and the LLTF 216 may be estimated based on when the autocorrelation decreases below a threshold 320. For example only, the threshold 320 may be selected based on a percentage (e.g., 80%) of a peak 324 of the autocorrelation. Symbol timing is adjusted by an offset (i.e., a timing advance, or TA) 328 to a time 332 that the correlation decreases below the threshold 320, where TA corresponds to a number of samples. In other words, the beginning of the LLTF 216 is estimated to be at TA samples prior to the time 332.

Figure 4:
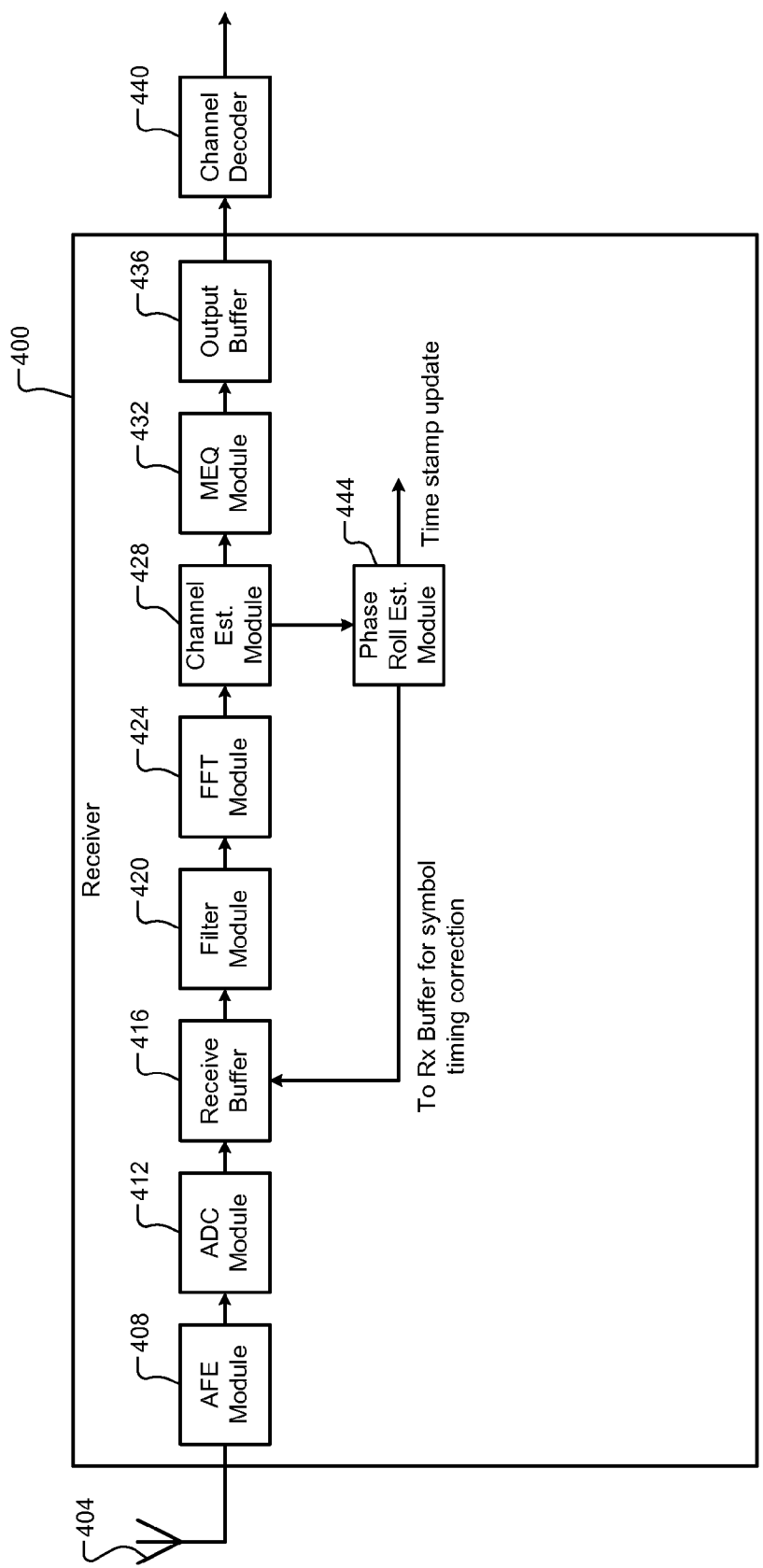
FIG. 4 is a functional block diagram of an example receiver according to the principles of the present disclosure.

FIG. 4 shows an example receiver 400 of a wireless communication device (e.g., implemented in a transceiver of the wireless communication device). For example only, the receiver 400 corresponds to a receiver configured to operate according to OFDM protocol, and therefore includes one or more components related to OFDM communication. The receiver 400 receives wireless signals via an antenna 404. Although one antenna is shown, the receiver 400 may include a plurality of antennas. For example, the plurality of antennas may be arranged in a multiple-input multiple-output (MIMO) configuration.

The receiver 400 includes, for example only, various receiver components including, but not limited to, an analog front-end (AFE) module 408 (e.g., a radio frequency and analog front-end), an analog-to-digital converter (ADC) module 412, a receive buffer 416, a filter module 420, a fast Fourier transform (FFT) module 424, a channel estimation module 428, a MIMO equalizer (MEQ) module 432, and an output buffer 436. Although shown at an output of the ADC module 412, the receive buffer 416 may be arranged at other locations in the receiver, such as at an input of the FFT module 424.

The AFE module 408 processes the wireless signals received via the antenna 404. For example, the AFE module 408 may down-convert the RF signals received via the antenna 404. The ADC module 416 converts an output of the AFE module 408 from an analog format to a digital format. The filter module 420 filters an output of the ADC module 412. For example, the filter module 420 may include a low-pass filter module. The FFT module 424 converts an output of the filter module 420 from the time domain to the frequency domain. An output of the FFT module 424 is further processed by the channel estimation module 428. For example, the channel estimation module 428 generates a channel estimate based on the output of the FFT module 424.

The channel estimation module 428 provides the channel estimate and the received signal (e.g., corresponding to the output of the FFT module 424) to the MEQ module 432. The MEQ module 432 applies MIMO equalization to the received signal based on the channel estimate. The equalized received signal passes through the buffer 436 prior to being received by a channel decoder 440, which decodes the received signal.

The receiver 400 further includes a phase roll estimation module 444. The phase roll estimation module 444 is configured to implement phase roll estimation according to an embodiment of the present disclosure. For example, the phase roll estimation module 444 receives the channel estimate from the channel estimation module 428 and estimates a phase roll associated with the received wireless signal (e.g., a phase roll observed with respect to the LLTF 216 of the data packet 200) based on the channel estimate. The estimated phase roll, which is caused by symbol timing error, is associated with phase differences across adjacent tones of the LLTF 216. Accordingly, the phase differences across adjacent tones of the LLTF 216 can be calculated and then averaged and scaled to determine the symbol timing error.

When the symbol timing error is known, the timing advance TA can be adjusted accordingly (e.g., increased or decreased by a number of samples to delay or advance, respectively, the timing of the received signal). For example, the phase roll estimation module 444 outputs the estimated phase roll to the receive buffer 416 for symbol timing correction. The receive buffer 416 stores samples of the received wireless signals and implements a read pointer to indicate a next sample to be output from the receive buffer

416. The receive buffer 416 is configured to correct the symbol timing, based on the estimated phase roll, by moving the read pointer forward (i.e., to advance the signal) or backward (i.e., to delay the signal) a number of samples corresponding to the estimated phase roll. For example only, the phase roll estimation module 444 may be configured to convert the estimated phase roll to a number of samples (positive or negative) and provide the number of samples to the receive buffer 416. The phase roll estimation module 444 may also calculate a time stamp update based on the timing advance TA to be applied by the receive buffer 416 and provide the time stamp update to a higher layer (e.g., a MAC device) of the receiving device.

Typically, phase roll $\theta_{PR}$ is estimated according to $$\theta_{PR} = \sum_{k \in \Gamma} \frac{\angle h_{est}^{(k+1)} - \angle h_{est}^{(k)}}{|\Gamma|}$$

(Equation 1), where $h_{est}^{(k)}$ is the LLTF channel estimate on tone k, $\Gamma$ is a set of the tones used for estimating phase roll, $|\Gamma|$ is the number of tones in the set $\Gamma$, and $\angle$ corresponds to an angle operation. Accordingly, the term $\angle h_{est}^{(k)} - \angle h_{est}^{(k)}$ corresponds to an increase in phase between tone k+1 and tone k, and dividing by the number of tones $|\Gamma|$ and summing the results for a plurality of adjacent tones provides an average of the phase differences between adjacent tones. For example only, in MIMO scenarios, $h_{est}^{(k)}$ corresponds to an LTF channel estimate between a given Tx and Rx antenna pair.

The phase roll estimation module 444 in an embodiment of the present disclosure estimates the phase roll according to $$\theta_{PR} = \angle \left[ \sum_{k \in \Gamma} (h_{est}^{(k+1)} h_{est}^{(k)*}) \right]$$

Figure 5:
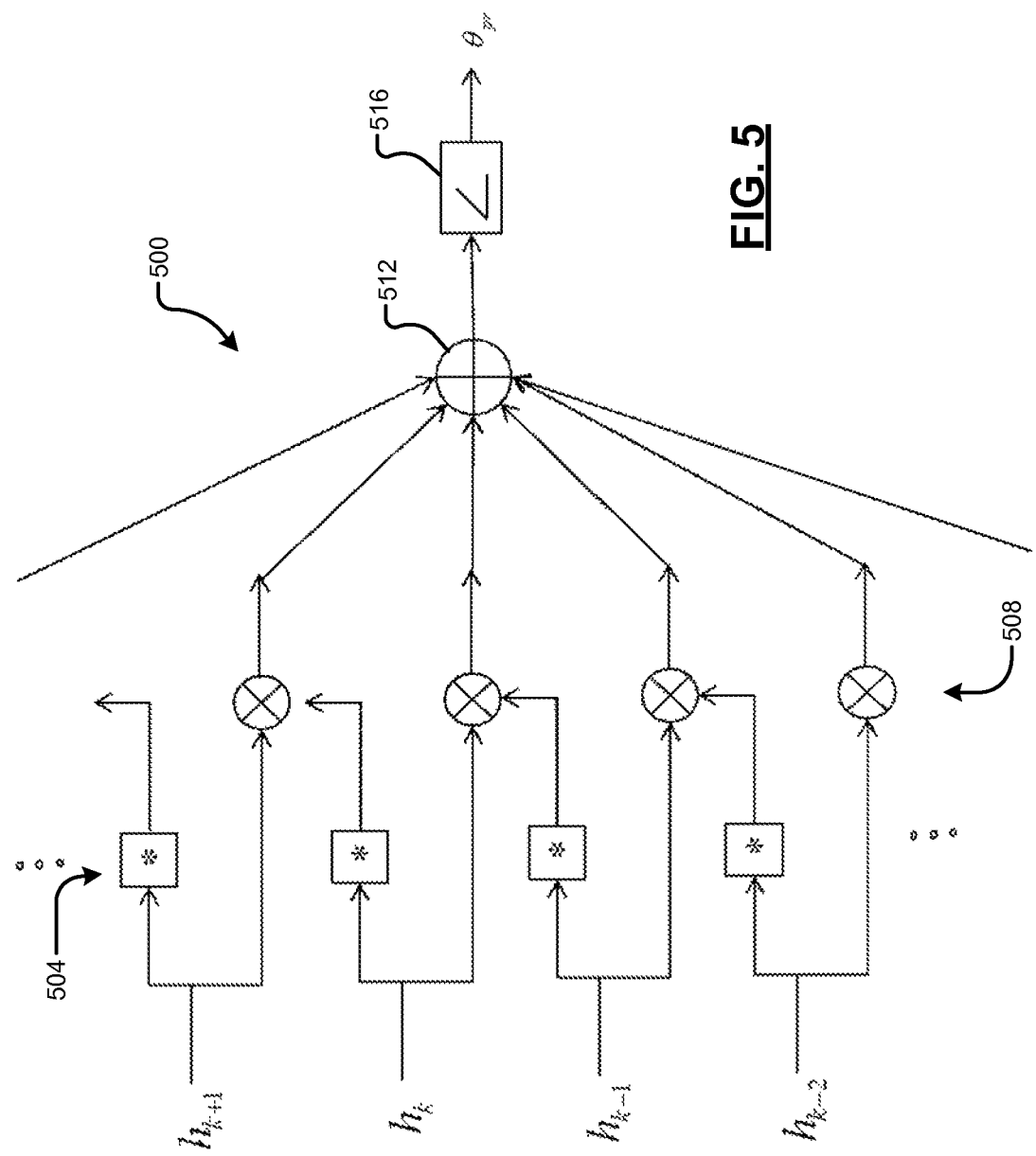
FIG. 5 is an example circuit configured to calculate phase roll according to the principles of the present disclosure.

(Equation 2), where $h_{est}^{(k)}$ is the channel estimate on tone k, $\Gamma$ is a set of the tones used for estimating phase roll (and can be any subset of the loaded data/pilot tones), and $|\Gamma|$ is the number of tones in the set $\Gamma$. FIG. 5 shows an example circuit 500 (e.g., implemented by the phase roll estimation module 444) configured to calculate the phase roll according to Equation 2. Channel estimates for adjacent tones . . . k+1, k, k−1, k−2 . . . are provided to respective conjugate operators 504, and the resulting conjugates are multiplied (using multipliers 508) by channel estimates for respective previous tones. For example, the conjugate of the channel estimate for tone k is multiplied by the channel estimate for tone k+1, the conjugate of the channel estimate for tone k−1 is multiplied by the channel estimate for tone k, etc. Outputs of the multipliers 508 are summed at a summing node 512. An output of the summing node 512 is converted to the phase roll $\theta_{PR}$ at an angle operation node 516. For example only, the angle operation node 516 implements a CORDIC operation.

The phase roll estimation module 444 in another embodiment of the present disclosure estimates the phase roll according to $$\theta_{PR} = \sum_{k \in \Gamma} \frac{\angle (h_{est}^{(k+1)} h_{est}^{(k)*} + h_{est}^{(k)} h_{est}^{(k-1)*})}{|\Gamma|}$$

(Equation 3). Accordingly, Equation 3 determines the phase roll using channel estimates for three tones (e.g., $h^{(k+1)}$, $h^{(k)}$, and $h^{(k-1)}$). Since three tones are used in the averaging of the phase error, effective noise can be reduced (e.g., by approximately 4 dB) prior to the angle operation. Other embodiments of Equation 3 may include more than three tones to further reduce effective noise.

The phase roll estimation module 444 in another embodiment of the present disclosure estimates the phase roll according to $$\theta_{PR} = \sum_{k \in \Gamma} \frac{\angle (h_{est}^{(k+K)} h_{est}^{(k)*} + h_{est}^{(k)} h_{est}^{(k-K)*})}{|\Gamma| * K},$$

where K is an integer greater than one (e.g., K=2). (Equation 4). In other words, Equation 4 considers phase differences across non-adjacent tones (e.g., from tone k+K to tone k, from tone k to tone k−K, etc.), which may assume that coherence bandwidth of the channel spans more than K tones.

In each of Equations 2-4, $\Gamma$ may correspond to any subset of the loaded tones, where the loaded tones correspond to data and pilot tones. The subset of the loaded tones may be defined differently depending on the type of data packet (e.g., legacy, high throughput (HT), very high throughput (VHT), etc.) and/or the bandwidth of the packet. In various embodiments, the pilot tones can be included or removed from the subset of the loaded tones.

As described, $h_{est}^{(k)}$ corresponds to the LTF channel estimate between a given antenna pair (e.g. a Tx antenna/Rx antenna pair). In HT/VHT WLAN packets, two separate fields—LLTFs and HT/VHTLTFs—are used in channel estimation. Accordingly, in embodiments, the phase roll estimation performed by the phase roll estimation module 444 may be performed on the LLTF and/or the HT/VHTLTF. In embodiments (e.g., depending on antenna configuration, etc.), phase roll estimates using the LLTFS and the HT/VHTLTF may be combined (e.g., averaged). For example, phase roll using LLTF ($\theta_{PR}^{LLTF}$) and HT/VHTLTF ($\theta_{PR}^{HT/VHTLTF}$) are averaged according to $$\theta_{PR} = \frac{\theta_{PR}^{LLTF} + \theta_{PR}^{HT/VHTLTF}}{2},$$

In another embodiment, the channel estimates using the LLTF and HT/VHTLTFF may be combined (averaged), prior to calculating phase roll according to one of Equations 2-4, according to $$h_{est}^{(k)} = \frac{h_{est,LLTF}^{k} + h_{est,HT/VHTLTF}^{k}}{2},$$

where $h_{est,LLTF}^{k}$ corresponds to the channel estimate calculated according to the LLTF and $h_{est,HT/VHTLTF}^{k}$ corresponds to the channel estimate calculated according to the HT/VHTLTF.

In another embodiment, the channel estimates using the LLTF and HT/VHTLTF may each be used to perform the phase roll estimation. For example, phase roll can be estimated according to $$\theta_{PR} = \angle \left[ \sum_{k \in \Gamma_{LLTF}} \left( h_{est,LLTF}^{(k+1)} h_{est,LLTF}^{(k)*} \right) + \sum_{k \in \Gamma_{HT/LLTF}} \left( h_{est,HT/LLTF}^{(k+1)} h_{est,HT/LLTF}^{(k)*} \right) \right].$$

Further, $\Gamma_{LLTF}$ and $\Gamma_{HT/VHTLTF}$ may correspond to different subsets of tones.

Figure 6:
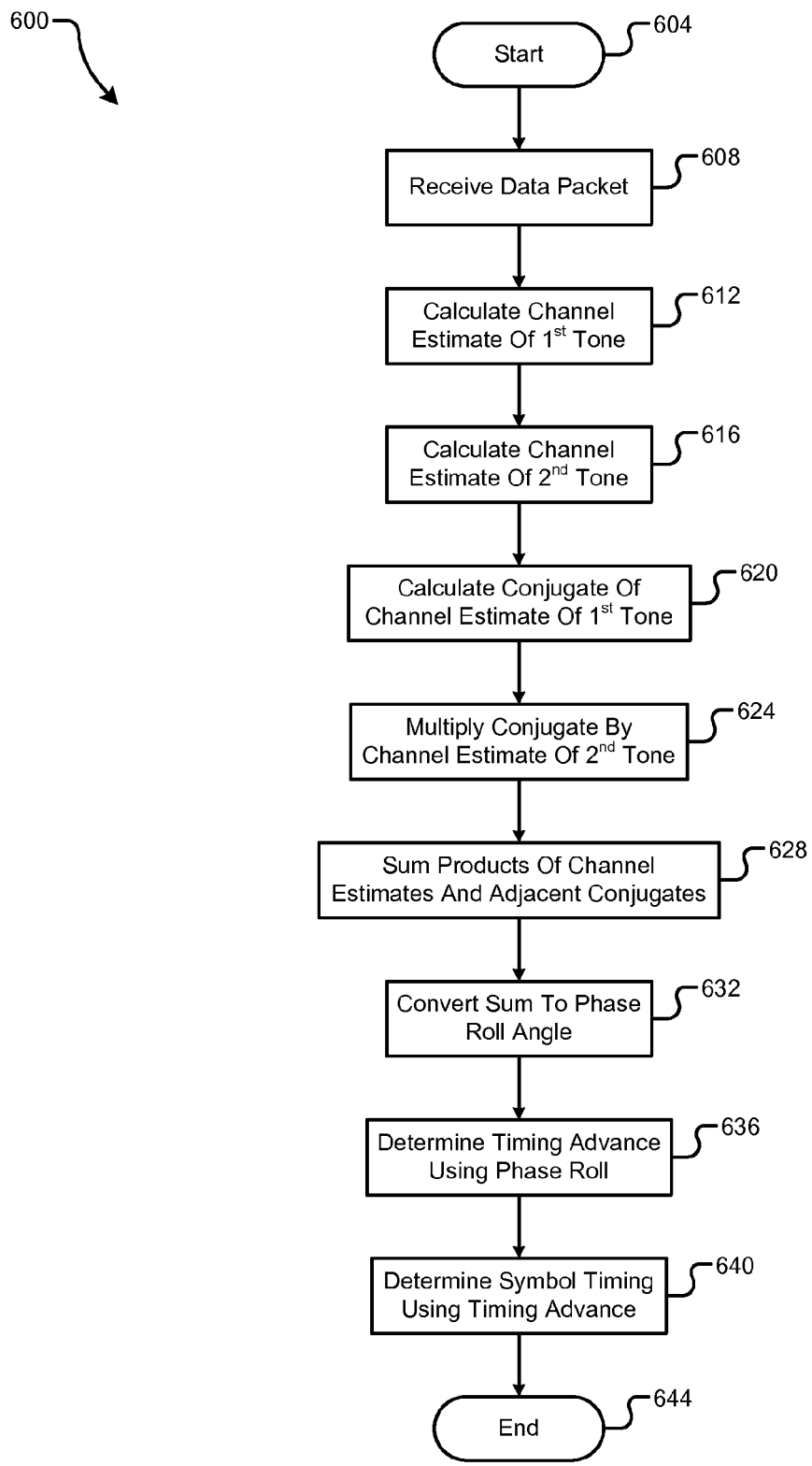
FIG. 6 is an example method for estimating phase roll according to the principles of the present disclosure.

FIG. 6 shows an example method 600, beginning at 604, for estimating phase roll according to the principles of the present disclosure. At 608, the method 600 receives (e.g., using a receiver of a wireless device) a data packet including one or more fields used to perform channel estimation (e.g., an LLTF, an HTLTF, a VHTLTF, etc.). At 612, the method 600 calculates a channel estimate of a first tone (e.g., a tone k) of the data packet. At 616, the method 600 calculates a channel estimate of a second tone (e.g., a tone k+1) of the data packet. At 620, the method 600 calculates a conjugate of the channel estimate of the tone k. At 624, the method 600 multiplies the conjugate of the channel estimate of the tone k by the channel estimate of the tone k+1. At 628, the method 600 sums the product of the conjugate of the channel estimate of the tone k and the channel estimate of the tone k+1 with products of the channel estimates of other tones and conjugates of channel estimates of respective adjacent tones. At 632, the method 600 converts the sum into an angle corresponding to phase roll. At 636, the method 600 determines a timing advance (correspond to a number of samples) using the phase roll. At 640, the method 600 determines symbol timing based on the timing advance. The method 600 ends at 644.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A receiver for a wireless device, the receiver comprising:
 a channel estimation module including circuitry configured to (i) calculate a first channel estimate on a first tone of a data packet received by the receiver, and (ii) calculate a second channel estimate on a second tone of the data packet; and
 a phase roll estimation module including circuitry configured to
  (i) calculate a complex conjugate of the second channel estimate,
  (ii) calculate, using the first channel estimate and the complex conjugate of the second channel estimate, an estimate of a phase roll associated with symbol timing of the data packet, wherein the phase roll corresponds to a difference between phases across adjacent tones of the data packet, wherein the phase roll is caused by an error in the symbol timing, and
  (iii) calculate, based on the estimate of the phase roll, a timing advance to be applied to the symbol timing of a received wireless signal of the data packet, wherein the timing advance corresponds to a number of samples of the data packet,
  wherein, to calculate the estimate of the phase roll, the phase roll estimation module includes circuitry configured to calculate the estimate of the phase roll based on a first product of (i) the first channel estimate and (ii) the complex conjugate of the second channel estimate, and
  wherein, to apply the timing advance to the symbol timing of the data packet, the receiver includes a receive buffer including circuitry configured to selectively advance or delay sampling of the received wireless signal in accordance with the estimate of the phase roll.

2. The receiver of claim 1, wherein the receive buffer further includes circuitry configured to (i) store the samples of the data packet, (ii) output the samples of the data packet according to a position of a read pointer, and (iii) selectively move the read pointer forward or backward according to the timing advance.

3. The receiver of claim 1, wherein, to calculate the estimate of the phase roll, the phase roll estimation module includes circuitry configured to:
 calculate a second product of (i) the second channel estimate and (ii) a complex conjugate of a third channel estimate; and
 calculate the estimate of the phase role based on a sum of (i) the first product and (ii) the second product.

4. The receiver of claim 1, wherein, to calculate the estimate of the phase roll, the phase roll estimation module includes circuitry configured to:
 calculate a second product of (i) the second channel estimate and (ii) a complex conjugate of a third channel estimate;
 sum (i) the first product and (ii) the second product; and
 divide the sum by a number of tones of the data packet being used to estimate the phase roll.

5. The receiver of claim 1, wherein the second tone is not adjacent to the first tone.

6. The receiver of claim 1, wherein the first tone and the second tone correspond to tones of a long training field of the data packet.

7. The receiver of claim 6, wherein the long training field corresponds to a legacy long training field, a high throughput long training field, or very high throughput long training field.

8. The receiver of claim 7, wherein, to calculate the estimate of a phase roll, the phase roll estimation module includes circuitry configured to average (i) a phase roll calculated using the legacy long training field and (ii) a phase roll calculated using the high throughput long training field or the very high throughput long training field.

9. A method for operating a receiver for a wireless device, the method comprising:
 calculating a first channel estimate on a first tone of a data packet received by the receiver;
 calculating a second channel estimate on a second tone of the data packet;
 calculating a complex conjugate of the second channel estimate;
 calculating, using the first channel estimate and the complex conjugate of the second channel estimate, an estimate of a phase roll associated with symbol timing of the data packet, wherein the phase roll corresponds to a difference between phases across adjacent tones of the data packet, wherein the phase roll is caused by an error in the symbol timing;
 calculating, based on the estimate of the phase roll, a timing advance to be applied to the symbol timing of the data packet, wherein the timing advance corresponds to a number of samples of the data packet; and
 applying the timing advance to processing of the data packet received by the receiver,
 wherein calculating the estimate of the phase roll includes calculating the estimate of the phase roll based on a first product of (i) the first channel estimate and (ii) the complex conjugate of the second channel estimate, and
 wherein applying the timing advance to the symbol timing of the data packet includes selectively advancing or delaying sampling of the received wireless signal in accordance with the estimate of the phase roll.

10. The method of claim 9, further comprising a receive buffer configured to (i) store the samples of the data packet, (ii) output the samples of the data packet according to a position of a read pointer, and (iii) selectively move the read pointer forward or backward according to the timing advance.

11. The method of claim 9, wherein calculating the estimate of the phase roll includes:
 calculating a second product of (i) the second channel estimate and (ii) a complex conjugate of a third channel estimate; and
 calculating the estimate of the phase role based on a sum of (i) the first product and (ii) the second product.

12. The method of claim 9, wherein calculating the estimate of the phase roll includes:
- calculating a second product of (i) the second channel estimate and (ii) a complex conjugate of a third channel estimate;
- summing (i) the first product and (ii) the second product; and
- dividing the sum by a number of tones of the data packet being used to estimate the phase roll.

13. The method of claim 9, wherein the second tone is not adjacent to the first tone.

14. The method of claim 9, wherein the first tone and the second tone correspond to tones of a long training field of the data packet.

15. The method of claim 14, wherein the long training field corresponds to a legacy long training field, a high throughput long training field, or very high throughput long training field.

16. The method of claim 15, wherein calculating the estimate of a phase roll includes averaging (i) a phase roll calculated using the legacy long training field and (ii) a phase roll calculated using the high throughput long training field or the very high throughput long training field.

* * * * *